US010030710B2

(12) United States Patent
Nicolas

(10) Patent No.: US 10,030,710 B2
(45) Date of Patent: Jul. 24, 2018

(54) BEARING IN WHICH ONE RING IS EQUIPPED WITH STRIPS FOR RETAINING A CODED RIBBON

(71) Applicant: Michel Nicolas, Annay la Côte (FR)

(72) Inventor: Michel Nicolas, Annay la Côte (FR)

(73) Assignee: AKTIEBOLAGET SKF, Gothenburg (SE)

( * ) Notice: Subject to any disclaimer, the term of this patent is extended or adjusted under 35 U.S.C. 154(b) by 83 days.

(21) Appl. No.: 15/266,002

(22) Filed: Sep. 15, 2016

(65) Prior Publication Data

US 2017/0082148 A1 Mar. 23, 2017

(30) Foreign Application Priority Data

Sep. 17, 2015 (FR) ...................... 1558756

(51) Int. Cl.
*F16C 41/00* (2006.01)
*F16C 19/34* (2006.01)

(52) U.S. Cl.
CPC ............ *F16C 41/007* (2013.01); *F16C 19/34* (2013.01); *F16C 2300/14* (2013.01); *F16C 2352/00* (2013.01)

(58) Field of Classification Search
CPC ........ F16C 19/34; F16C 19/36; F16C 19/361; F16C 19/362; F16C 19/364; F16C 19/38; F16C 19/381; F16C 19/383; F16C 19/385; F16C 19/386; F16C 19/388; F16C 33/58; F16C 33/581; F16C 33/583; F16C 33/586; F16C 2352/00
See application file for complete search history.

(56) References Cited

U.S. PATENT DOCUMENTS

| 8,664,944 B2 * | 3/2014 | Mitterreiter ............. F16C 19/38 324/173 |
| 2009/0174151 A1 * | 7/2009 | Kobayashi .......... F16C 33/7879 277/551 |
| 2014/0248014 A1 * | 9/2014 | Schmid ................. F16C 41/007 384/448 |

FOREIGN PATENT DOCUMENTS

| DE | 102015219167 A1 * | 4/2017 | ............ F16C 41/007 |
| EP | 0814338 A1 | 12/1997 | |
| EP | 1653079 A2 * | 5/2006 | .............. F16C 33/58 |
| FR | 2959569 A1 | 11/2011 | |
| JP | 2006064147 A | 3/2006 | |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing providing a first ring and a second ring, capable of rotating concentrically relative to one another, equipped with at least one incorporated device for detecting the movement of the rings relative to one another is provided. The detection device includes at least a coder element mounted on the first ring and at least a sensor element mounted on the second ring, facing the coder element, the coder element providing at least one linear ribbon arranged on a cylindrical surface of the first ring. The first ring of the bearing is equipped with at least one retaining strip that extends over the ribbon.

12 Claims, 3 Drawing Sheets

BEARING IN WHICH ONE RING IS EQUIPPED WITH STRIPS FOR RETAINING A CODED RIBBON

CROSS REFERENCE TO RELATED APPLICATIONS

This application claims priority to French patent application no. 1558756 filed on Sep. 17, 2015, the contents of which are fully incorporated herein by reference.

FIELD OF THE INVENTION

The present invention relates to the field of bearings comprising an inner ring and an outer ring which are concentric and rotatable relative to one another.

BACKGROUND OF THE INVENTION

In particular, the invention relates to the field of large diameter bearings, particularly roller bearings, which are required to withstand high axial and radial loads, and are used, notably, in machines or installations to form guide bearings with vertical axes of rotation, for example in tunneling machines or mining extraction machines.

BRIEF SUMMARY OF THE INVENTION

A bearing equipped with a coder element in the form of a glued-on circumferential ribbon, and the outer ring is equipped with a sensor element facing the coder element to detect the rotation of the rings relative to one another.

In practice, there is a risk that the ribbon may become detached. If this detachment occurs, then on the one hand detection is clearly no longer possible, and on the other hand the detached ribbon forms an impediment to the operation of the bearing. A costly intervention requiring a stoppage for dismantling and reassembly of the machine is then necessary.

The object of the present invention is to overcome the above drawbacks.

According to one embodiment of the invention, a bearing is proposed, comprising a first ring and a second ring capable of rotating concentrically relative to one another.

The bearing is equipped with at least one incorporated device for detecting the movement of the rings relative to one another, this detection device comprising at least a coder element mounted on the first ring and at least a sensor element mounted on the second ring, facing the coder element.

The coder element provides at least a linear ribbon arranged on a cylindrical surface of the first ring.

The first ring is equipped with at least one retaining strip extending over the ribbon.

The retaining strip may provide an axial portion extending axially over the ribbon and a radial end portion facing a radial surface of the first ring.

The end portion may be fastened to the first ring by at least one axial screw.

The retaining strip may provide another radial end portion facing another radial surface of the first ring, so that the strip takes the form of a clamp straddling an annular part of the first ring.

The other radial end portion may be equipped with a terminal portion engaged in an annular groove in the first ring.

The axial portion of the retaining strip may bear on a cylindrical surface of the first ring.

The ribbon may be placed inside an annular groove in the first ring.

The retaining strip may mate with the corresponding shape of the first ring.

The ribbon may be magnetized successively with (+) poles and (−) poles, the retaining strip being made of a non-magnetic material.

A plurality of retaining strips may be distributed circumferentially on the first ring.

The ribbon may be magnetized successively with (+) poles and (−) poles, the retaining strip being made of a non-magnetic material.

A plurality of retaining strips may be distributed circumferentially on the first ring.

BRIEF DESCRIPTION OF THE SEVERAL VIEWS OF THE DRAWING

A bearing equipped with a detection device will now be described by way of an exemplary embodiment, illustrated in the drawing, in which.

DETAILED DESCRIPTION OF THE INVENTION

Figure 1:
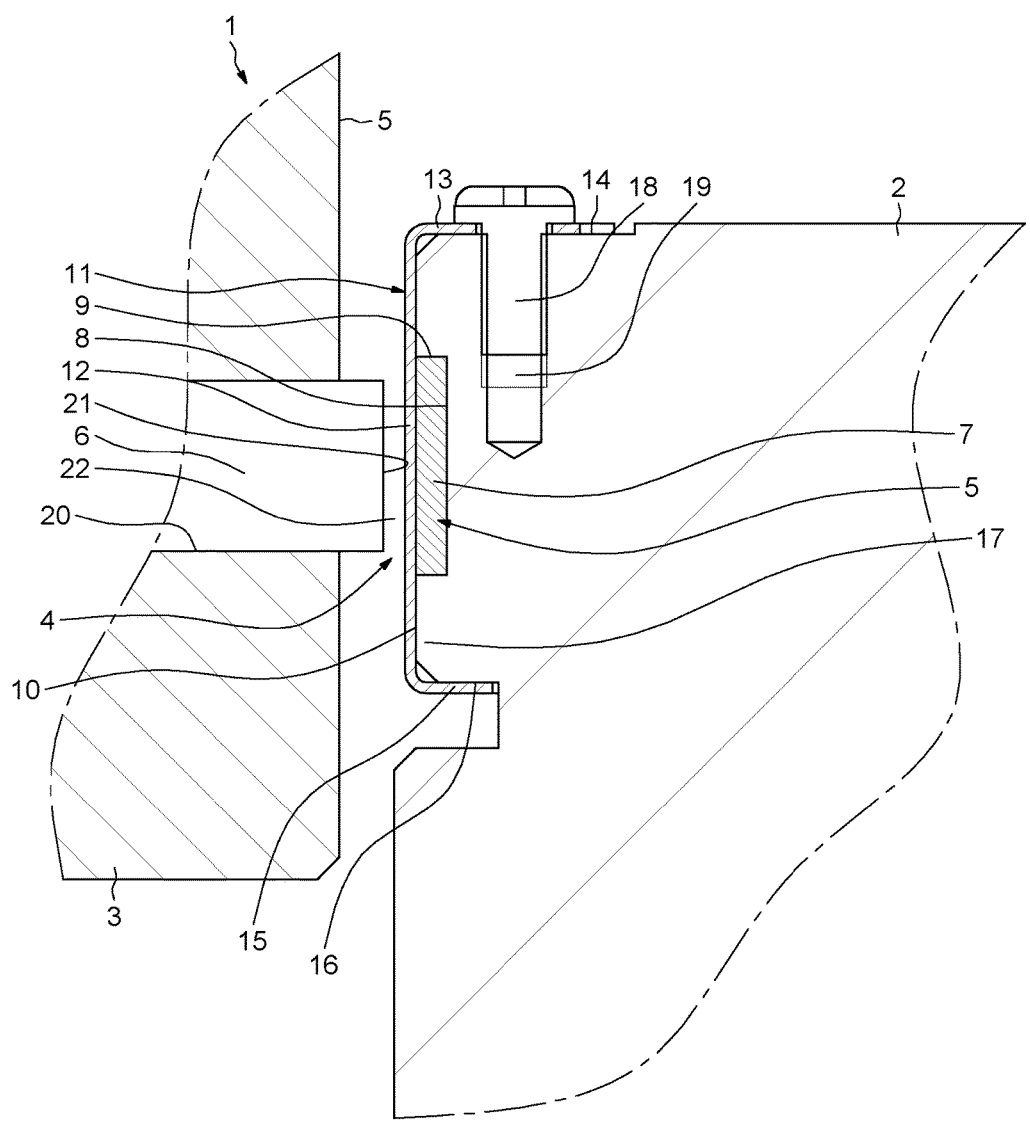
FIG. 1 shows a partial section through a bearing according to the present invention.
Figure 2:
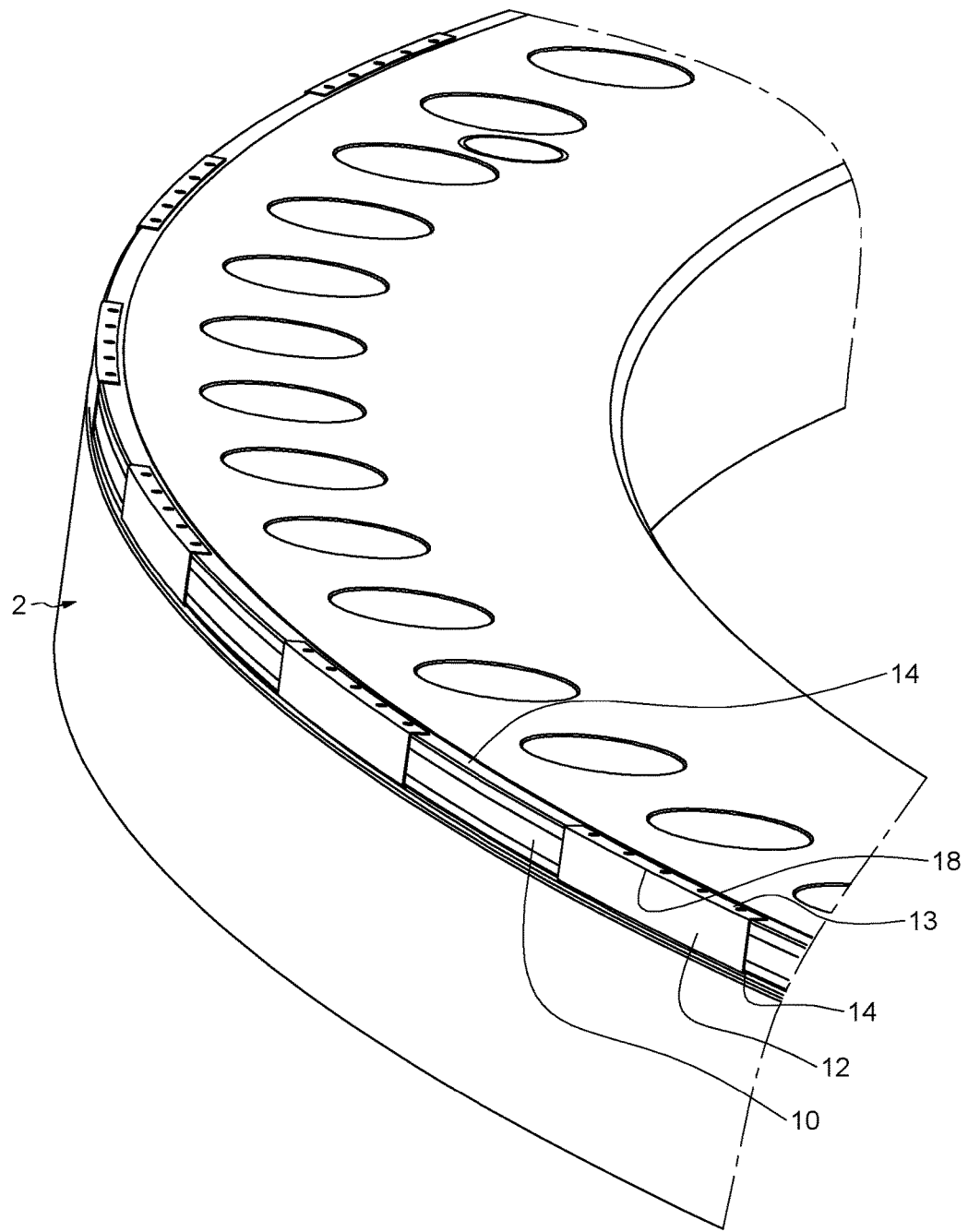
FIG. 2 shows a partial perspective view of an inner ring of the bearing of FIG. 1.

As shown in FIGS. 1 and 2, a bearing 1 provides an inner ring 2 and an outer ring 3, arranged concentrically and capable of rotating relative to one another about an axis (not shown).

The bearing 1 may be a roller bearing, in which case the rings 2 and 3 are connected by at least one row of rolling elements (not shown), or may be a sliding bearing.

The bearing 1 is equipped with an incorporated movement detection device 4 for detecting rotary and/or axial movements of the rings 2 and 3 relative to one another.

The detection device 4 provides a coder element 5 mounted on the inner ring 2 and a sensor element 6 mounted on the outer ring 3, facing the coder element 5.

The coder element 5 provides a circumferential linear coder ribbon 7 placed flat on a cylindrical surface 8 of the inner ring 2 and attached by gluing, for example. Advantageously, this cylindrical surface 8 forms the base of an annular recess 9 provided in a cylindrical surface 10 of the inner ring 2. The annular recess 9 is preferably dimensioned to receive the linear ribbon 7 without any play, the ribbon lying flush with the cylindrical surface 10 of the ring 2.

The inner ring 2 is equipped with a plurality of retaining strips 11 for the local retention of the coder ribbon 7, these strips being spaced apart circumferentially.

Each retaining strip 11 provides an axial portion 12 which extends over the coder ribbon 7 and which bears, axially on either side of the recess 8, locally on the cylindrical surface 10, and preferably on the coder ribbon 7.

Each retaining strip 11 further provides a radial end portion 13 which extends radially inward from an edge of the axial portion 12 and which bears on a radial annular surface 14 of the inner ring 2. In cross section, the axial portion 12 and the radial end portion 13 form an L-shape.

The axial portion 12 has a cylindrical shape and mates with the cylindrical shape of the cylindrical surface 10 of the inner ring. The radial end portion 13 may have a cylindrical inner edge.

Preferably, each retaining strip 11 further provides a radial end portion 15 which extends radially inward from the other edge of the axial portion 12, and which faces a radial annular surface 16 of the inner ring 2 and preferably bears on this surface 16. The retaining strip 11 then takes the form of a clamp with a U-shaped cross section, fitted, preferably without any play, so as to straddle an annular part 17 of the inner ring 2 defined between the opposed annular surfaces 14 and 16 and the cylindrical surface 10 of the inner ring 2. The radial end portion 15 may have a cylindrical inner edge.

Each retaining strip 11 is fastened to the inner ring 2 by axial screws 18 which pass through its radial portion 13 and are screwed into axial holes 19 in the inner ring 2, formed in the radial annular surface 14.

The sensor element 6 is mounted locally in a radial hole 20 in the outer ring 3, and has an end 21 facing the coder ribbon 7. When the rings 2 and 3 rotate relative to one another, the end 21 of the sensor element 6 moves circumferentially at a distance from the coder ribbon 7 and from the retaining strips, leaving a gap 22.

Figure 3:
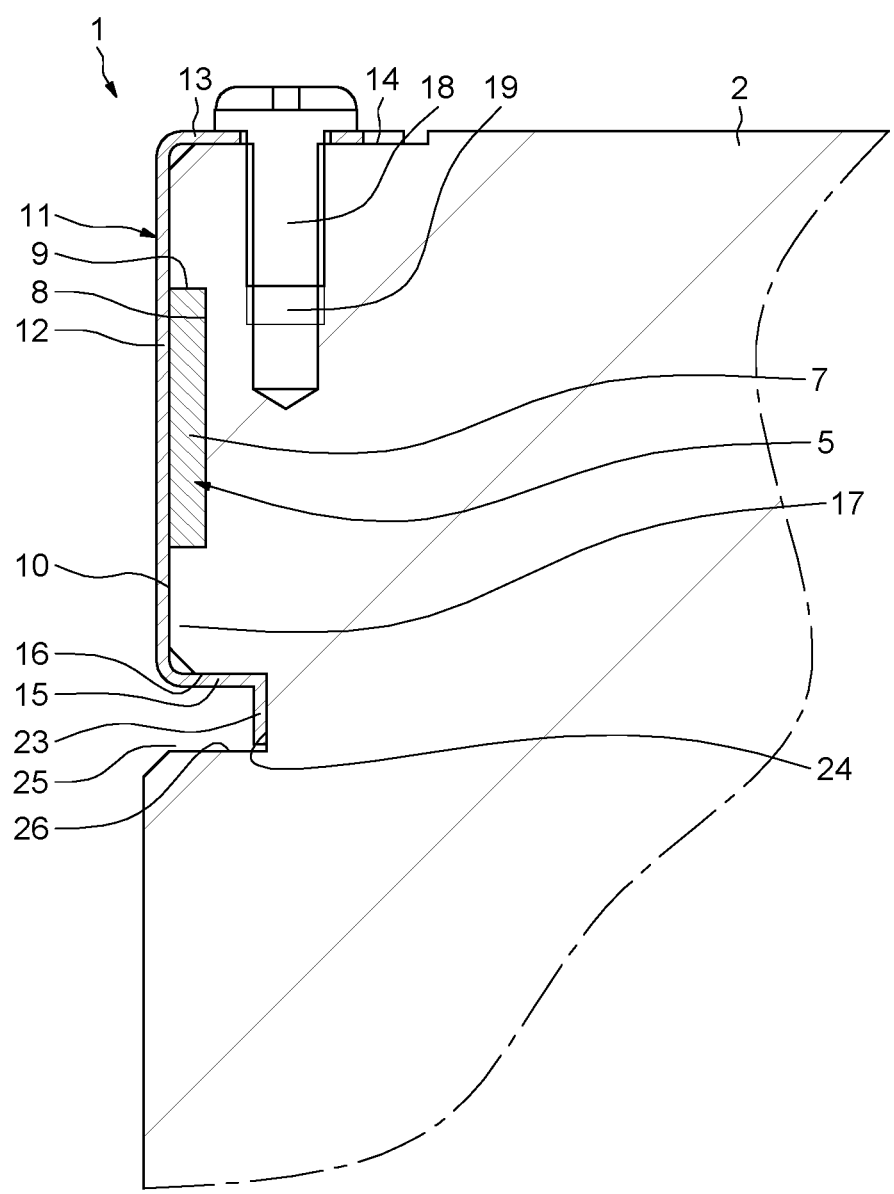
FIG. 3 shows a variant embodiment of the bearing of FIG. 1.

According to a variant embodiment shown in FIG. 3, each retaining strip 11 further provides a terminal portion 23, which prolongs the radial portion 15 and extends on or near the cylindrical base 24 of a groove 25 in the inner ring 2, one of the sides of this groove being the radial surface 16 and this groove having an opposite radial side 26.

Advantageously, the radial portion 15 and the terminal portion 23, which form an L-shape in cross section, may be inserted without play or by force-fitting into the annular groove 25 of the inner ring 2. The terminal portion 23 has a cylindrical shape which mates with the base shape 24 of the annular groove 25.

Because of the presence of the retaining strips 11, which are distributed circumferentially and preferably in a regular manner, the coded ribbon 7 is held in position in addition to being glued. Thus the risks of detachment of the coded ribbon 7 are prevented.

The coder ribbon 7 includes a magnetized strip, coded alternately in (+) poles and (−) poles. The retaining strips 11 are then made of a non-magnetic steel, such that they can pass through the magnetic field of this magnetized strip without perturbation. When the rings 2 and 3 rotate relative to one another, the variations of the magnetic field are detected by the sensor element 6. The screws 18 may also be made of non-magnetic steel.

The invention claimed is:

1. A bearing comprising:
a first ring, and a second ring, capable of rotating concentrically relative to one another, equipped with at least one detection device for detecting the movement of the rings relative to one another, and
at least one retaining strip on the first ring,
wherein the detection device provides at least a coder element mounted on the first ring and at least a sensor element mounted on the second ring, facing the coder element,
wherein the coder element includes at least one ribbon arranged on a cylindrical surface of the first ring, and
wherein the first ring is equipped with the retaining strip and the retaining strip extends over the ribbon, so the ribbon is between the first ring and the retaining strip.

2. The bearing according to claim 1, wherein the retaining strip comprises an axial portion extending axially over the ribbon and a radial end portion facing a radial surface of the first ring.

3. The bearing according to claim 2, wherein the radial end portion is fastened to the first ring by at least one axial screw.

4. The bearing according to claim 2, wherein the retaining strip comprises a second radial end portion facing a second radial surface of the first ring, so that the strip takes the form of a clamp straddling an annular part of the first ring.

5. The bearing according to claim 4, wherein the second radial end portion is equipped with a terminal portion engaged in an annular groove in the first ring.

6. The bearing according to claim 1, wherein the axial portion of the retaining strip bears on a cylindrical surface of the first ring.

7. The bearing according to claim 1, wherein the ribbon is placed inside an annular groove in the first ring.

8. The bearing according to claim 1, wherein the retaining strip mates with the corresponding shape of the first ring.

9. The bearing according to claim 1, wherein the ribbon is magnetized successively with (+) poles and (−) poles, the retaining strip being made of a non-magnetic material.

10. The bearing according to claim 1, further comprising a plurality of retaining strips distributed circumferentially on the first ring.

11. A bearing comprising:
a first ring, and a second ring, capable of rotating concentrically relative to one another, equipped with at least one detection device for detecting the movement of the rings relative to one another,
an annular groove in the first ring,
wherein the detection device provides at least a coder element mounted on the first ring and at least a sensor element mounted on the second ring, facing the coder element,
wherein the coder element includes at least one ribbon arranged on a cylindrical surface of the first ring,
wherein the first ring is equipped with at least one retaining strip that extends over the ribbon, and
wherein the ribbon is placed inside the annular groove in the first ring.

12. A bearing comprising:
a first ring, and a second ring, capable of rotating concentrically relative to one another, equipped with at least one detection device for detecting the movement of the rings relative to one another, and
a plurality of retaining strips distributed circumferentially on the first ring,
wherein the detection device provides at least a coder element mounted on the first ring and at least a sensor element mounted on the second ring, facing the coder element,
wherein the coder element includes at least one ribbon arranged on a cylindrical surface of the first ring, and
wherein the first ring is equipped with at least one retaining strip of the plurality of retaining strips that extends over the ribbon.

* * * * *